(12) United States Patent
Avanessians et al.

(10) Patent No.: US 11,909,743 B1
(45) Date of Patent: Feb. 20, 2024

(54) ORGANIZATION-LEVEL ACCOUNT ON DATA PLATFORM

(71) Applicant: Snowflake Inc., Bozeman, MT (US)

(72) Inventors: Christine A. Avanessians, Walnut Creek, CA (US); Damien Carru, New York, NY (US); Ramachandran Natarajan Iyer, Fremont, CA (US); Dennis Edgar Lynch, San Carlos, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/352,059

(22) Filed: Jul. 13, 2023

(51) Int. Cl.
*H04L 9/40* (2022.01)

(52) U.S. Cl.
CPC .......... *H04L 63/105* (2013.01); *H04L 63/102* (2013.01)

(58) Field of Classification Search
CPC ............................ H04L 63/105; H04L 63/102
See application file for complete search history.

(56) References Cited

U.S. PATENT DOCUMENTS

| | | | |
|---|---|---|---|
| 5,560,005 A | 9/1996 | Hoover et al. | |
| 7,072,911 B1 | 7/2006 | Doman et al. | |
| 7,409,428 B1 | 8/2008 | Brabec et al. | |
| 8,635,271 B1 | 1/2014 | Adya et al. | |
| 9,172,699 B1 | 10/2015 | Vazquez et al. | |
| 9,774,626 B1 | 9/2017 | Himler et al. | |
| 9,847,973 B1 | 12/2017 | Jakobsson et al. | |
| 10,057,197 B1 | 8/2018 | Ritchie et al. | |
| 10,133,866 B1 | 11/2018 | Kumar et al. | |
| 10,397,624 B1 | 8/2019 | Largman et al. | |
| 10,680,986 B1 | 6/2020 | Wu | |
| 10,791,119 B1 | 9/2020 | Coleman | |
| 10,880,322 B1 | 12/2020 | Jakobsson et al. | |
| 11,019,076 B1 | 5/2021 | Jakobsson et al. | |
| 11,102,244 B1 | 8/2021 | Jakobsson et al. | |
| 11,137,886 B1 | 10/2021 | Richards et al. | |
| 11,175,806 B1 | 11/2021 | Mccue et al. | |
| 11,539,791 B1 | 12/2022 | Mikolajczuk et al. | |
| 11,567,908 B1 * | 1/2023 | Cline | G06F 3/0671 |
| 11,599,512 B1 * | 3/2023 | Liu | G06F 16/258 |
| 11,614,924 B1 * | 3/2023 | Agrawal | G06F 8/33 717/105 |
| 11,620,310 B1 * | 4/2023 | Akidau | G06F 9/4881 707/615 |
| 11,752,433 B2 | 9/2023 | Kung et al. | |
| 11,757,914 B1 | 9/2023 | Jakobsson et al. | |
| 11,764,950 B2 * | 9/2023 | Padmanabhan | H04L 9/0822 707/827 |

(Continued)

OTHER PUBLICATIONS

"U.S. Appl. No. 18/334,864, Non Final Office Action dated Sep. 19, 2023", 13 pages.

(Continued)

*Primary Examiner* — Stephen T Gundry
(74) *Attorney, Agent, or Firm* — Schwegman Lundberg & Woessner, P.A.

(57) ABSTRACT

Systems and methods for an organization-level account for an organization on a data platform, users of which can possess administrative or management privileges with respect to the organization and across one or more others accounts of the organization.

30 Claims, 6 Drawing Sheets

(56) References Cited

U.S. PATENT DOCUMENTS

| | | | |
|---|---|---|---|
| 11,765,035 B2* | 9/2023 | Gunda | G06Q 10/105 |
| | | | 709/223 |
| 2002/0049818 A1 | 4/2002 | Gilhuly et al. | |
| 2004/0044780 A1 | 3/2004 | Eastham | |
| 2004/0139158 A1 | 7/2004 | Datta | |
| 2004/0199486 A1 | 10/2004 | Gopinath et al. | |
| 2005/0172121 A1 | 8/2005 | Risan et al. | |
| 2007/0038719 A1 | 2/2007 | Brown et al. | |
| 2007/0123307 A1 | 5/2007 | Adams et al. | |
| 2007/0180151 A1 | 8/2007 | Richardson et al. | |
| 2007/0266208 A1 | 11/2007 | Kim et al. | |
| 2007/0271310 A1 | 11/2007 | Han et al. | |
| 2010/0293015 A1 | 11/2010 | Coglianese et al. | |
| 2012/0042391 A1 | 2/2012 | Risan | |
| 2012/0173635 A1 | 7/2012 | Wormald et al. | |
| 2013/0174234 A1 | 7/2013 | Yang et al. | |
| 2015/0161412 A1 | 6/2015 | Price et al. | |
| 2015/0264143 A1 | 9/2015 | Wiesen et al. | |
| 2015/0310664 A1 | 10/2015 | Boussard et al. | |
| 2016/0150010 A1 | 5/2016 | Takase | |
| 2016/0294748 A1 | 10/2016 | Yang et al. | |
| 2016/0352816 A1 | 12/2016 | Xiao | |
| 2017/0324684 A1 | 11/2017 | Dharmapalan et al. | |
| 2018/0034750 A1 | 2/2018 | Wang et al. | |
| 2018/0152397 A1 | 5/2018 | Tang et al. | |
| 2018/0152471 A1 | 5/2018 | Jakobsson | |
| 2018/0157795 A1 | 6/2018 | Dejana et al. | |
| 2018/0198878 A1 | 7/2018 | Keldenich et al. | |
| 2018/0207528 A1 | 7/2018 | Palikuqi et al. | |
| 2018/0359288 A1 | 12/2018 | Wang et al. | |
| 2019/0098056 A1 | 3/2019 | Pitre et al. | |
| 2019/0146711 A1 | 5/2019 | Scholl et al. | |
| 2019/0266178 A1 | 8/2019 | Madhavan et al. | |
| 2019/0347067 A1 | 11/2019 | Jolfaei | |
| 2020/0028815 A1 | 1/2020 | He et al. | |
| 2020/0036667 A1 | 1/2020 | Talton et al. | |
| 2020/0065117 A1 | 2/2020 | Krum et al. | |
| 2020/0201840 A1 | 6/2020 | Pfeiffer et al. | |
| 2020/0213405 A1 | 7/2020 | Goenka et al. | |
| 2020/0274876 A1 | 8/2020 | Mathew et al. | |
| 2020/0351192 A1 | 11/2020 | Murao | |
| 2020/0366678 A1 | 11/2020 | Mutha et al. | |
| 2020/0402048 A1 | 12/2020 | Cluxton | |
| 2021/0021563 A1 | 1/2021 | Hegde | |
| 2021/0089357 A1 | 3/2021 | Garaga et al. | |
| 2021/0173493 A1 | 6/2021 | Barzilay et al. | |
| 2022/0006771 A1 | 1/2022 | Tack et al. | |
| 2022/0012645 A1 | 1/2022 | Ying et al. | |
| 2022/0061023 A1 | 2/2022 | Xu et al. | |
| 2022/0078797 A1 | 3/2022 | Helms et al. | |
| 2022/0287089 A1 | 9/2022 | Singh et al. | |
| 2022/0292080 A1 | 9/2022 | Rao et al. | |
| 2022/0417251 A1 | 12/2022 | Gilbert et al. | |
| 2023/0051206 A1* | 2/2023 | Gunda | G06F 16/25 |
| 2023/0107925 A1* | 4/2023 | Collver | G06F 16/2455 |
| | | | 707/718 |
| 2023/0125747 A1* | 4/2023 | Kherani | G06Q 10/06313 |
| | | | 705/7.23 |
| 2023/0138870 A1* | 5/2023 | Buscaglia | G06Q 10/1091 |
| | | | 705/7.18 |
| 2023/0168971 A1* | 6/2023 | Mehta | G06F 11/1461 |
| | | | 711/162 |
| 2023/0169466 A1* | 6/2023 | Prakash | G06Q 40/08 |
| | | | 705/37 |
| 2023/0169608 A1* | 6/2023 | Suryanarayana | G06F 16/2457 |
| | | | 705/32 |
| 2023/0177481 A1* | 6/2023 | Motlagh | H04L 63/104 |
| | | | 705/51 |
| 2023/0185825 A1* | 6/2023 | Gernhardt | G06F 16/184 |
| | | | 707/613 |
| 2023/0188431 A1* | 6/2023 | Esposito | H04L 63/102 |
| | | | 709/225 |
| 2023/0214753 A1* | 7/2023 | Eidelman | G06N 5/02 |
| | | | 705/7.37 |
| 2023/0214949 A1* | 7/2023 | Eidelman | G06Q 50/18 |
| | | | 705/311 |
| 2023/0231822 A1 | 7/2023 | Cuan et al. | |
| 2023/0244671 A1* | 8/2023 | Gunda | G06F 16/24553 |
| | | | 707/769 |
| 2023/0247088 A1 | 8/2023 | Kondratiev et al. | |
| 2023/0259616 A1 | 8/2023 | Rodriguez Bravo et al. | |
| 2023/0259647 A1* | 8/2023 | Yip | G06F 21/604 |
| | | | 726/28 |
| 2023/0281278 A1* | 9/2023 | Fernandez Garcia | G06F 21/645 |
| | | | 705/59 |
| 2023/0281343 A1* | 9/2023 | Buscaglia | G06F 16/24573 |
| | | | 726/27 |
| 2023/0281698 A1 | 9/2023 | Anaparthi et al. | |

OTHER PUBLICATIONS

"U.S. Appl. No. 18/334,864, Notice of Allowance dated Oct. 16, 2023", 10 pgs.

"U.S. Appl. No. 18/334,864, Response filed Sep. 25, 2023 to Non Final Office Action dated Sep. 19, 2023", 17 pgs.

* cited by examiner

ORGANIZATION-LEVEL ACCOUNT ON DATA PLATFORM

TECHNICAL FIELD

Embodiments of the disclosure relate generally to databases and, more specifically, to an organization-level account for an organization on a data platform, users of which can possess administrative or management privileges with respect to the organization and across one or more others accounts of the organization.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
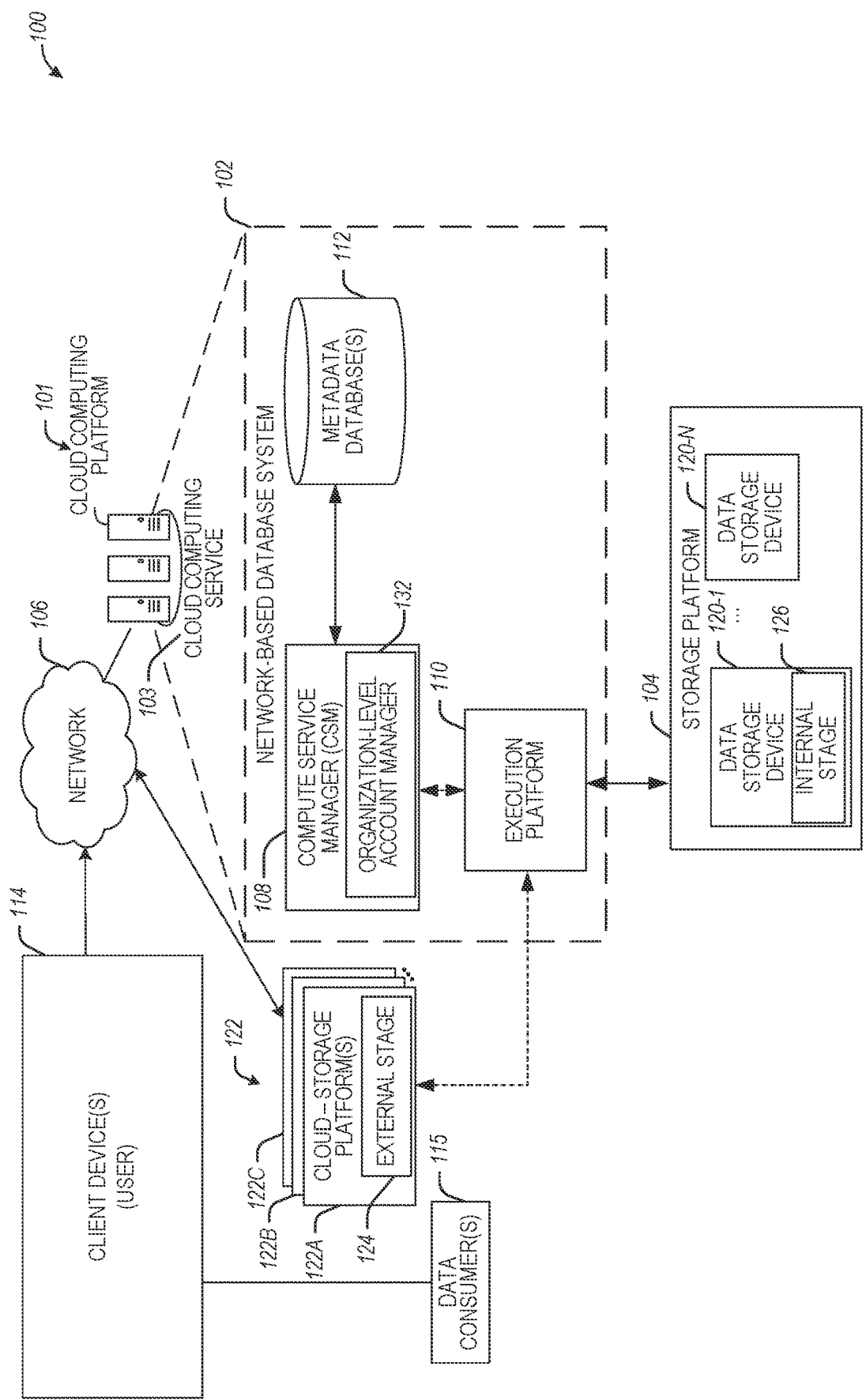
FIG. 1 illustrates an example computing environment including a network-based database system, which is in communication with a cloud storage platform and is using an organization-level account manager that supports organization-level accounts for organizations, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in user accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, on, etc.) what is referred to herein as an "internal storage location." If stored external to the data platform, a given file is referred to herein as an "external file" and is referred to as being stored in (or at, on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of an account, such as a user account. The data platform may include one or more databases that are respectively maintained in association with any number of user accounts (e.g., accounts of one or more data providers or other types of users), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular user accounts as well. Users and/or executing processes that are associated with a given user account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a user account) may reside as a data object (or object) within, e.g., a user account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A data platform (e.g., database system) can support data storage for one or more different organizations (e.g., customer organizations, which can be individual companies or business entities), where each individual organization can have one or more accounts (e.g., customer accounts) associated with the individual organizations, and each account can have one or more users (e.g., unique usernames or logins with associated authentication information). Additionally, an individual account can have one or more users that are designated as an administrator for the individual account. An individual account of an organization can be associated with a specific cloud platform (e.g., cloud-storage platform, such as such as AMAZON WEB SERVICES™ (AWS™), MICROSOFT® AZURE®, GOOGLE CLOUD PLATFORM™), one or more servers or data centers servicing a specific region (e.g., geographic regions such as North America, South America, Europe, Middles East, Asia, the Pacific, etc.), a specific version of a data platform, or a combination thereof. A user of an individual account can be unique to the account. Additionally, a data platform can use an organization data object to link accounts associated with (e.g., owned by) an organization, which can facilitate management of objects associated with the organization, account management, billing, replication, failover/failback, data sharing within the organization, and the like.

At present, when a customer wishes to create or manage accounts on a data platform in connection with the customer's organization, the customer enables at least one of their existing accounts to further serve as an organization administrator (org admin) account. Generally, such an org-admin-enabled account is not restricted by geography, business needs, or user access, and any admin user of this org-admin-enabled account can grant an organization administrator role to any user or non-system role in this org-admin-enabled account. An org-admin-enabled account lacks fine-grained control of who can cause performance of administrative/management operations (hereafter, also referred to as administrative-level operations), and does not provide a centralized management plane for an organization (e.g., no central location to view organization usage information). If an org-admin-enabled account is ever removed, the customer would need to ensure another existing account is organization administrator enabled. Additionally, an org-admin-enabled account can involve replicating objects to all deployments and can involve passing replication messages between deployments in order to facilitate object management. A result, an org-admin-enabled account can require multiple copies of large datasets be replicated between an ever-shifting number of deployments in an organization.

Aspects of the present disclosure provide techniques that implement an organization-level account for an organization on a data platform (e.g., data platform comprising multiple deployments), users of which can possess administrative or management privileges with respect to the organization and across one or more other accounts (e.g., non-organization-level accounts) of the organization. In particular, for some embodiments, an organization-level account of a given organization is an account with one or more properties that provides a centralized view of the given organization and from where a user of the organization-level account can perform one or more organization-level management operations. One or more users of an organization-level account of a given organization can control multiple accounts (e.g., all accounts) of the given organization. Accordingly, an organization-level account of a given organization (e.g., one that is a multi-account organization) can serve as a central control plane for the given organization and can isolate management of the given organization (e.g., to one or more users of the organization-level account). For some embodiments, an organization-level account of a given organization comprises one or more users, which can include at least one administrative user (admin user) that can manage aspects of the organization-level account, such as adding (e.g., creating) a new user (e.g., non-administrative user), removing (e.g., deleting) an existing user (e.g., non-administrative user) of the organization-level account, or changing a role or a privilege with respect to a user. A user (e.g., admin user) of an organization-level account of a given organization can log into the organization-level account (e.g., as their console) for performing one or more administrative/management operations of the given organization, which can include administrative/management operations on one or more accounts of the given organization. For instance, administrative/management operations performed by a user of an organization-level account of a given organization can include, without limitation: management of a non-organization-level account of the given organization, which can include account-level creation, read, update, and delete (CRUD) with respect to the given organization (e.g., add or remove a user with respect to the non-organization-level account); management of one or more data objects across and within accounts (e.g., global objects or centralized data definition language (DDL)); monitor or audit organization-wide data/metadata (e.g., one or more organization views) of the given organization; view or manage (e.g., add) organization views of the given organization; manage lifecycle of an application (e.g., object footprint) of an account of the given organization; switch into an account-specific context (e.g., switch into a context of an account of the given organization, such as a non-organization-level account);

move (e.g., migrate) one account from one deployment to another deployment; move (e.g., migrate) one account from the given organization to another organization, merge one or more accounts of the given organization with one or more accounts of another organization; or setup backup/failover for the organization-level account (e.g., business continuity data recovery (BCDR) for the given organization account to either secondary read copies or true failover). Hereafter, BCDR is used to generally refer to data recovery for backup or failover scenarios (e.g., failure of a deployment that includes a primary organization-level account). To facilitate this, a user of an organization-level account of a given organization can be granted or associated with an administrative role (e.g., organization-administrator role, also referred to herein as org-admin or ORGADMIN) with respect to the given organization, thereby enabling the user to perform administrative/management operations.

For some embodiments, an organization-level account is generated (e.g., created) for a given organization such that one or more users associated with the organization-level account can have an organization-administrator (org-admin) role. According to various embodiments, a user of the organization-level account that an org-admin role is an administrator of the given organization, and can enable the user to cause performance of a set of organization administrative/management operations with respect to the given organization. For instance, the user can cause performance of one or more account CRUD operations with respect to the given organization, such as CREATE ACCOUNT, ALTER ACCOUNT, DROP ACCOUNT, UNDROP ACCOUNT, LIST ORGANIZATION ACCOUNTS, and the like. The user can cause upgrading or downgrading of one or more services or service levels (e.g., on the data platform) being provided to the given organization. The user can cause enabling or disabling data replication (or replication) of one or more data objects (e.g., databases, etc.) associated with the given organization. The user can cause performance of one or more management-unit CRUD operations with respect to the given organization, where a management unit comprises a grouping of accounts of the given organization. The user can cause generation (e.g., creation), management, and removal (e.g., deletion) of an organization-level object. An organization-level object can comprise a global data object that exists at an organization-level (or an organization-level global data object) on the data platform and that is accessible at the organization level. The user can cause management of global parameters, global policies, or both with respect to (e.g., applied against) accounts of the given organization. The user can cause performance of one or more DDL operations with respect to (e.g., to make updates to) one or more specified accounts of the given organization.

Table 1 below provides example defined data language (DDL) a user can use in association with organization-level accounts.

TABLE 1

| DDL | Operation Description |
|---|---|
| CREATE ORGANIZATION ACCOUNT <acct_name> ORGADMIN_NAME = < string> { ORGADMIN_PASSWORD = '<string_literal>' \| ORGADMIN_RSA_PUBLIC_KEY = <string> } [ FIRST_NAME = < string> ] [ LAST_NAME = < string> ] EMAIL = '<string>' [ MUST_CHANGE_PASSWORD = { TRUE \| FALSE } ] EDITION = { ENTERPRISE \| BUSINESS_CRITICAL } [ REGION_GROUP = <region_group_id> ] [ REGION = <region_id> ] [ COMMENT = '<string_literal>' ] | Create an organization-level account with respect to a given organization, and specify a user of the organization-level having a role of org-admin. Performance (e.g., execution) of this operation can be limited to an admin user of a non-organization-level account of the given organization. For some embodiments, the name of the organization-level account being created is prevented from conflicting with any existing non-organization-level account name. |
| ALTER ORGANIZATION ACCOUNT SET {[ accountParams ] [ userParams ] [ objectParams ] [ sessionParams ]} ALTER ORGANIZATION ACCOUNT UNSET <param_name> [, ... ] ALTER ORGANIZATION ACCOUNT SET RESOURCE MONITOR = <monitor_name> ALTER ORGANIZATION ACCOUNT SET { PASSWORD \| SESSION } POLICY = '<string_literal>' ALTER ORGANIZATION ACCOUNT UNSET { PASSWORD \| SESSION } POLICY ALTER ORGANIZATION ACCOUNTSET TAG <tag_name> = '<tag_value>' [, <tag_name> = '<tag_value>' ... ] ALTER ORGANIZATION ACCOUNT UNSET TAG <tag_name> [, <tag_name> ... ] ALTER ORGANIZATION ACCOUNT <account_name> RENAME TO <new_account_name> | Alter one or more properties of an organization-level account of respect to a given organization. Performance (e.g., execution) of this operation can be limited to a user of the organization-level account (e.g., not a user from any other account), and can be further limited to a user of the organization-level account that has a role of org-admin. |

TABLE 1-continued

| DDL | Operation Description |
|---|---|
| [SAVE_OLD_URL={TRUE | FALSE}] ALTER ORGANIZATION ACCOUNT <account_name> DROP OLD URL | |
| ALTER ORGANIZATION ACCOUNT <account_name> ENABLE FAILOVER [ FAILOVER_REGION = <region_name>, [ <region_name>, ... ][ REPLICATION_SCHEDULE = '{ <num> MINUTE | USING CRON <expr> <time_zone> }' ] [CONNECTION NAME = <connection_name>] | Alter an organization-level account of a given organization to enable BCDR for the organization-level account. One or more deployments can each be set to have a secondary organization-level account (e.g., multiple secondary organization-level accounts can be set up/established for the primary organization-level account). The replication schedule can be set according to a failover group. A user can cause performance (e.g., execution) of this operation to enable failover and to set (e.g., specify) a failover deployment (e.g., region), a replication schedule, a connection name, or some combination thereof. The operation can:<br>a. Create a connection, <connection_name>.<br>b. Generate (e.g., create) one or more secondary organization-level accounts with a system-generated name at the specified deployment(s) (e.g., in the specified provided region(s)).<br>c. Enable replication between the (primary) organization-level account and the one or more secondary organization-level accounts generated.<br>d. Alter Connection <connection_name> to authorize the one or more secondary organization-level accounts generated, any of which the connection can failover to.<br>e. Generate (e.g., create) replica connection.<br>f. Generate (e.g., create) one or more failover groups to facilitate failover.<br>g. Replicate (e.g., on first data refresh) over all data objects within the (primary) organization account (e.g., including, but not limited to, users, roles, databases, warehouses, and organization views) to the one or more secondary organization-level accounts generated.<br>h. Perform replication based on (e.g., according to) specified replication schedule.<br>Performance (e.g., execution) of this operation can be limited to a user of the organization-level account (e.g., not a user from any other account), and can be further limited to a user of the organization-level account that has a role of org-admin. |
| ALTER ORGANIZATION ACCOUNT <account_name> SET REGION = <region_name> | Move the location of an organization-level account from a first deployment (e.g., first region) to a second deployment (e.g., a second region). This can be facilitated either by way of BCDR (e.g., replicating the organization-level account on the first deployment as a secondary organization-level account on the second deployment, setting the secondary organization-level account as primary, and removing the original organization-level account on the first deployment). |

TABLE 1-continued

| DDL | Operation Description |
|---|---|
| | Setting the region parameter to another region value can cause: the organization-level account to move to the deployment corresponding to the region value, cause all data objects (e.g., all data) inside the organization-level account to move to the deployment, and all the organization views to move to the deployment. |
| DROP ORGANIZATION ACCOUNT <account_name> GRACE_PERIOD_IN_DAYS = <integer><br><br>Where:<br><account_name> is the name of the organization-level account<br>GRACE_PERIOD_IN_DAYS is the time window between 3 and 90 where the organization-level account can be undropped. | Drop an organization-level account, such as a secondary organization-level account. For some embodiments, an organization must have at least one organization-level account if it is a multi-account organization, and it is not possible to drop the primary organization account (only secondary organization-level accounts). Dropping a secondary organization-level account can remove one or more of the secondary organization-level accounts that have been created when BCDR is enabled. For some embodiments, dropping a secondary organization-level account only happens from the primary organization-level account. Performance (e.g., execution) of this operation can be limited to a user of the organization-level account (e.g., not a user from any other account), and can be further limited to a user of the organization-level account that has a role of org-admin. |
| UNDROP [ORGANIZATION] ACCOUNT <account_name> | Undrop an organization-level account (e.g., during a window specified in the DROP function). Undropping a specified organization-level account can cause the specified organization-level account to be restored (e.g., as a secondary organization-level account and not the primary account). Performance (e.g., execution) of this operation can be limited to a user of the organization-level account (e.g., not a user from any other account), and can be further limited to a user of the organization-level account that has a role of org-admin. |
| SHOW ORGANIZATION ACCOUNTS | Show a list of all organization-level accounts (e.g., both primary and secondary organization level accounts) of a given organization. Performance (e.g., execution) of this operation can be limited to a user of the organization-level account (e.g., not a user from any other account), and can be further limited to a user of the organization-level account that has a role of org-admin. |
| SHOW ACCOUNTS | Show a list of all accounts (e.g., organization-level and non-organization-level accounts) of a given organization. Performance (e.g., execution) of this operation can be limited to a user of the organization-level account (e.g., not a user from any other account), and can be further limited to a user of the organization-level account that has a role of org-admin. |

While one or more users of an organization-level account can be associated with (e.g., assigned or granted) an org-admin role, for some embodiments, one or more users of the organization-level account can be associated with (e.g., assigned or granted) a custom organization level role that has one or more fine-grained privileges (e.g., one or more of the organization administrative/management operations can be a grantable privilege that will allow custom role creation). Additionally, with respect to a non-organization-level account of a given organization, a user of an organization-level account (of the given organization) associated with (e.g., assigned or granted) an organization user admin (org-user-admin) role can have: privileges similar to a user admin of the non-organization-level account; privileges for a global user creation and role creation and management, or both. With respect to a non-organization-level account of a given organization, a user of an organization-level account (of the given organization) associated with (e.g., assigned or granted) an organization security admin (org-security-admin) role can have: privileges similar to a security admin of the non-organization-level account; privileges for managing global object grants, or both. With respect to a non-organization-level account of a given organization, a user of an organization-level account (of the given organization) associated with (e.g., assigned or granted) an organization system admin (org-system-admin) role can have: privileges similar to a system admin of the non-organization-level account; privileges for causing performance of data definition language (DDL)(e.g., such as SQL) across one or more non-organization-level accounts of the given organization, or both. With respect to a non-organization-level account of a given organization, a user of an organization-level account (of the given organization) associated with (e.g., assigned or granted) an organization billing admin (org-billing-admin) role can have privileges for viewing financial or usage organization views or defining and managing budgets for the given organization. With respect to a non-organization-level account of a given organization, a user of an organization-level account (of the given organization) associated with (e.g., assigned or granted) an organization monitoring admin (org-monitoring-admin) role can have privileges for viewing, managing, or auditing organization views of the given organization.

With respect to a non-organization-level account of a given organization, a user of an organization-level account (of the given organization) associated with (e.g., assigned or granted) an organization admin (org-security-admin) role can: access organization views of the given organization, which can include usage views of all accounts of the given organization; or enable or disable a subset of organization view categories from within the organization-level account. If a given organization wants to have multiple organization-level accounts with organizational views, additional organization-level accounts (e.g., secondary organization-level accounts) can be created through BCDR. As one or more new features/operations (e.g., administrative/management operations) at an organizational level are introduced, new privileges tied to these features/operations can be granted. When a user of an organization-level account calls for performance of an administrative/management operation, privileges of the user can be checked and, if the feature/operation involves a 'write' operation (e.g., create/update/delete, setting parameters), the 'primary' status of the organization-level account can be checked to be true prior to the administrative/management operation being performed. In this way, various embodiments can enforce administrative/management functionality being routed through the primary organization-level account.

For some embodiments, each organization has at least one organization-level account. Additionally, for some embodiments, each organization has a single organization-level account active at a given time. For instance, the organization-level account can be designated as a 'special' account that permits the addition of new org-level management privileges and certain restrictions (such as restricting only one primary organization account for a given organization). An organization-level account can be a read/write account on a data platform, can leverage CRUD functionality of existing accounts, can include BCDR support, and can include role-based access control (RBAC) logic. For some embodiment, data platform is configured such that all organization-level operations (e.g., administrative/management operations at the organization level) for a given organization are limited to an organization-level account of the given organization. For some embodiments, there is a single active primary organization-level account for a given organization, and one or more secondary organization-level accounts for the given organization. Depending on the embodiment, each secondary organization-level account can be a read replica (e.g., read-only replica) of an active primary organization-level account. Any of the one or more secondary organization-level accounts can serve as a backup or failover account for the primary organization-level account. For instance, upon failure of a current deployment hosting an active primary organization-level account of a given organization, a secondary organization-level account (of the active primary organization-level account) on a different deployment can be set as the new, active primary organization-level account for the given organization. Additionally, any of the one or more secondary organization-level accounts can be created or deleted while the single primary organization-level account remains active. For some embodiments, an active primary organization-level account resides on a single deployment of the data platform, while secondary organization-level accounts reside on deployments different from the single deployment (e.g., each secondary organization-level account respectively resides on a deployment different from the single deployment). While a user of an active primary organization-level account of a given organization can cause performance of one or more organization-level administrative/management operations with respect to the given organization, a user of a secondary organization-level account can be configured to cause performance of only one or more read-only administrative/management operations (e.g., administrative/management operations that cause data writes are limited to users of the active primary organization-level account), at least until the secondary organization-level account is set as an active primary organization-level account.

To implement backup/failover of an organization-level account, a data platform of some embodiments support setup or establish of a secondary (e.g., backup/failover) organization-level account for BCDR, where BCDR functionality can be supported and an 'enable failover' function can be supported. For some embodiments, the data platform performs the following operations to setup or establish a secondary organization-level account for an existing organization-level account currently active as a primary organization-level account: generating (e.g., creating) a connection data object in the existing primary organization-level account (which can leverage a connection workflow); generating (e.g., creating); a second organization-level account (e.g., with an auto/system-generated name to ensure uniqueness within the organization) at a given deployment of the data platform (e.g., a specified deployment that is different from the deployment that has the existing primary organization-level account); and setting up or establishing replication (e.g., a replication group for the primary organization-level account) and failover between the existing primary organization-level account and the second organization-level account (e.g., leverage connection failover workflow), thereby rendering the second organization-level account as a secondary organization-level account to the existing primary organization-level account. Thereafter, on an initial refresh, one or more objects of the existing organization-level account are replicated to the secondary organization-level account. The replication schedule between the existing primary organization-level account and the secondary organization-level account can be based on an entity property specified in an 'enable failover' statement. For various embodiments, the data platform can support multiple secondary organization-level accounts for an existing organization-level account that is currently set as a primary organization-level account.

After setup or establishment of a secondary organization-level account is completed for an existing primary organization-level account, replication and failover from the existing primary organization-level account to the secondary organization-level account can be facilitated in a manner similar to non-organization-level accounts. For various embodiments, when a secondary organization-level account exists for a primary organization-level account for a given organization, organization-level management operations for the given organization are routed to (e.g., facilitated through) the primary organization-level account and not the secondary organization-level account. Additionally, for some embodiments, organization-level management operations for the given organization are routed to (e.g., facilitated through) the primary organization-level account, while the secondary organization-level account is limited to operations relating to listing or viewing information about the given organization (e.g., viewing organization usage views).

A data platform of various embodiments supports one or more operations for moving or migrating accounts relating to an organization-level account. Depending on the embodiment, the moving or merging workflows supported by the data platform can include one or more of the following: moving a non-organization-level account to an organization that only has one non-organization-level account; moving a non-organization-level account from an organization that will only have one non-organization-level account left; merging two organizations that each have a single non-organization-level account; merging one organization having a single non-organization-level account with another organization having multiple non-organization-level accounts; and merging two organizations that each have multiple non-organization-level accounts. For various embodiments, the data platform is configured such that it is possible for an organization to only have a single non-organization-level account and no organization-level account. Additionally, the data platform can be configured to require an organization to have an organization-level account once the organization has multiple accounts (e.g., multiple non-organization-level accounts).

With respect to moving a non-organization-level account to a target organization that only has one non-organization-level account, the target organization becomes a multi-account organization. As a result, a user request to move the non-organization-level account to the target organization can cause a data platform to determine (e.g., check) whether the target organization has an organization-level account prior to permitting the non-organization-level account to move the target organization. If the data platform determines that the target organization has an organization-level account, the move is permitted and, if otherwise, the data platform can indicate a failure to the user or cause generation (e.g., creation) of an organization-level account for the target organization.

With respect to moving a non-organization-level account from a source organization that will only have one non-organization-level account left, the data platform can permit the move and an organization-level account of the source organization can remain in place and not removed (e.g., deleted).

A user request to merge two organizations (a source organization into a source organization) that each have a single non-organization-level account can cause a data platform to determine (e.g., check) whether the target organization has an organization-level account prior to permitting the merge. A user request to merge a first organization having a single non-organization-level account into a second organization having multiple non-organization-level accounts can cause the data platform to permit the merge and retain an organization-level account of the second organization. The data platform can automatically remove (e.g., delete or drop) an organization-level account of the first organization if it exists (e.g., after the merge). Alternatively, a user request to merge a first organization having multiple non-organization-level accounts into a second organization having a single non-organization-level account can cause the data platform to determine (e.g., check) whether the second organization has an organization-level account prior to permitting the merger. If the data platform determines that the second organization has an organization-level account, the merge is permitted and, if otherwise, the data platform can indicate a failure to the user or cause generation (e.g., creation) of an organization-level account for the second organization.

With respect to merging two organizations that each have multiple non-organization-level accounts and a respective organization-level account, a user can request to merge the two organizations while specifying which of the organization-level accounts will be retained. For instance, where a first organization is being merged into a second organization: the organization-level account of the first organization can be retained by the merged organization that results while the organization-level account of the second organization is removed (e.g., deleted or dropped); the organization-level account of the first organization can be removed (e.g., deleted or dropped) while the organization-level account of the second organization is retained by the merged organization that results; or a new organization-level account is generated (e.g., on a specified deployment) for the merged organization and the existing organization-level accounts of the first and the second organizations are removed (e.g., deleted or dropped). For various embodiments, the merged organization that results retains the non-organization-level accounts of the first organization and the second organization, and a user of the organization-level account of the merged organization can perform one or more administrative/management operations with respect to the non-organization-level accounts of the merged organization (e.g., based on the role associate with the user). Additionally, for various embodiments, the data platform is configured to update one or more organization views based on movement of one or more accounts or merging of organizations.

By use of an organization-level account with a given organization, a data platform can provide the given organization with a central location (e.g., console) from which to manage the given organization, which can include a user of the organization-level account causing performance of one or more various administrative/management operations (e.g., administrative tasks) with respect to the given organization (e.g., in a central environment). An organization-level account of a given organization can be useful for a customer who has multiple accounts (e.g., non-organization-level accounts) in their organization. An organization-level account of a given organization can enable use organization views for the given organization. An organization-level account of a given organization can facilitate maintenance of a single set of human users on a data platform (e.g., via global users) for the given organization. An organization-level account of a given organization can facilitate monitoring or auditing of organization-wide metadata of the given organization, can facilitate management of objects across different accounts of the given organization, or can facilitate management of a lifecycle of an account of the given organization. Overall, an organization-level account of a given organization can enable at scale management of the given organization by a customer.

As used herein, a non-organization-level account can include any account that is not an organization-level account as described herein.

As used herein, the organization-level object comprises a global data object that exists at an organization-level (or an organization-level global data object) on the data platform and that is accessible at the organization level. The organization-level global data object can be used as a generic organization object that is owned by a specific organization but not owned by any specific account of the specific organization. By way of an organization-level account of a specific organization, an organization-level global data object owned by the specific organization can be managed by one or more users of the organization-level account. An organization-level object is a system level data object that is scoped to all of a specific organization and accounts associated with the specific organization. Accordingly, an organization-level global data object of a specific organization is not tied to any specific account (e.g., to any specific non-organization-level account) of the specific organization. In this way, an organization-level global data object can be freely moved around or replicated within one or more accounts of the specific organization or can facilitate easy failover of the organization-level global data object.

As used herein, a deployment (e.g., of a data platform) can comprise a location, a database vendor, a database provider, a computing device, or some combination thereof, where database data (e.g., comprising one or more data objects) is replicated. For instance, for some embodiments, an organization-level global data object associated with a specific organization is replicated at each deployment associated with the specific organization. Generally, multiple deployments can provide different benefits to a database client, such as data being backed up at more than one deployment or faster data access based on geographic or network proximity of a given deployment to the database client. For instance, in the event that one deployment is unavailable due to a power outage, a system error, a scheduled maintenance downtime, or the like, a failover process can ensure a different deployment can take over the management and operation of the database. As used herein, a region can refer to a specific deployment that serves one or more specific regions.

The various embodiments that are described herein are described with reference where appropriate to one or more of the various figures. An example computing environment with an organization-level account manager configured to perform the disclosed techniques is discussed in connection with FIGS. 1-3. Example deployments using organization-level accounts are discussed in connection with FIG. 4. Example functionalities associated with organization-level accounts are discussed in connection with FIG. 5. A more detailed discussion of example computing devices that can be used with the disclosed techniques is provided in connection with FIG. 6.

FIG. 1 illustrates an example computing environment 100 including a network-based database system 102, which is in communication with a cloud storage platform and is using an organization-level account manager 132 that supports organization-level accounts for organizations, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102 and a storage platform 104 (also referred to as a cloud storage platform). The cloud computing platform 101 provides computing resources and storage resources that can be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities. The cloud computing platform 101 may include a three-tier architecture: data storage (e.g., storage platform 104 and storage platforms 122), an execution platform 110 (e.g., providing query processing), and a compute service manager 108 providing cloud services including services associated with the disclosed functionalities.

It is often the case that organizations that are users of a given data platform also maintain data storage (e.g., a data lake) that is external to the data platform (i.e., one or more external storage locations). For example, a company could be a user of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The user's servers and cloud-storage platforms are both examples of what a given user could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given user stores at a given external storage location may or may not be stored in an external stage in the external storage location; i.e., in some data-platform implementations, it is a user's choice whether to create one or more external stages (e.g., one or more external-stage objects) in the user's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as a user device) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network. In some embodiments, the user of the client device 114 can be a data provider configured to provide services to other users such as data consumers 115.

In the description below, actions are ascribed to users of the network-based database system. Such actions shall be understood to be performed concerning client device 114 (or multiple client devices) operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user of the network-based database system shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, the one or more metadata databases 112 may include a summary of data stored in remote data storage systems as well as data available from a local cache. Additionally, the one or more metadata databases 112 may include information regarding how data is organized in remote data storage systems (e.g., the storage platform 104) and the local caches. Information stored by the one or more metadata databases 112 allows systems and services to determine whether a piece of data needs to be accessed without loading or accessing the actual data from a storage device. In some embodiments, the one or more metadata databases 112 are configured to store account object metadata (e.g., account objects used in connection with a replication group object).

Figure 3:
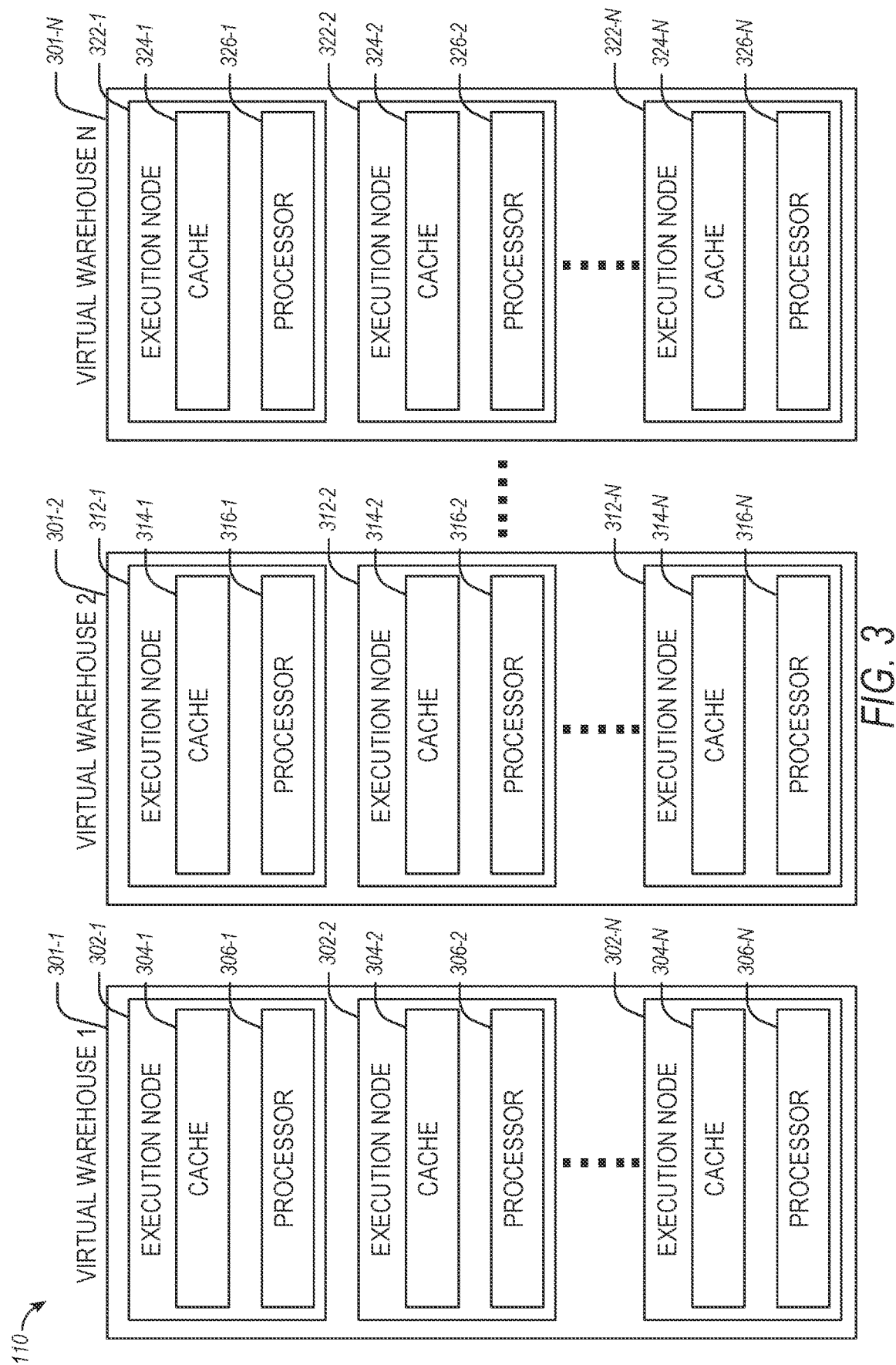
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud-storage platforms 122A, 122B, . . . , 122C (collectively referred to as storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and an external stage 124 may reside on one or more of the storage platforms 122.

In some embodiments, the compute service manager 108 includes an organization-level account manager 132 that comprises suitable circuitry, interfaces, logic, and/or code and is configured to perform the disclosed functionalities associated with managing one or more organization-level accounts, across deployments of the network-based database system 102, in connection with one or more organizations. For instance, the organization-level account manager 132 of some embodiments can implement (or otherwise support) operations with respect to an organization-level account, such as creating, editing, or deleting an organization-level account of a specified organization. More regarding organization-level accounts is discussed in connection with FIG. 5.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, the one or more metadata databases 112, execution platform 110, and storage platform 104 may be implemented as a distributed system (e.g., distributed across multiple systems/platforms at multiple geographic locations). Additionally, each of the compute service manager 108, the one or more metadata databases 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be good candidates for processing the task. Metadata stored in the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

Figure 2:
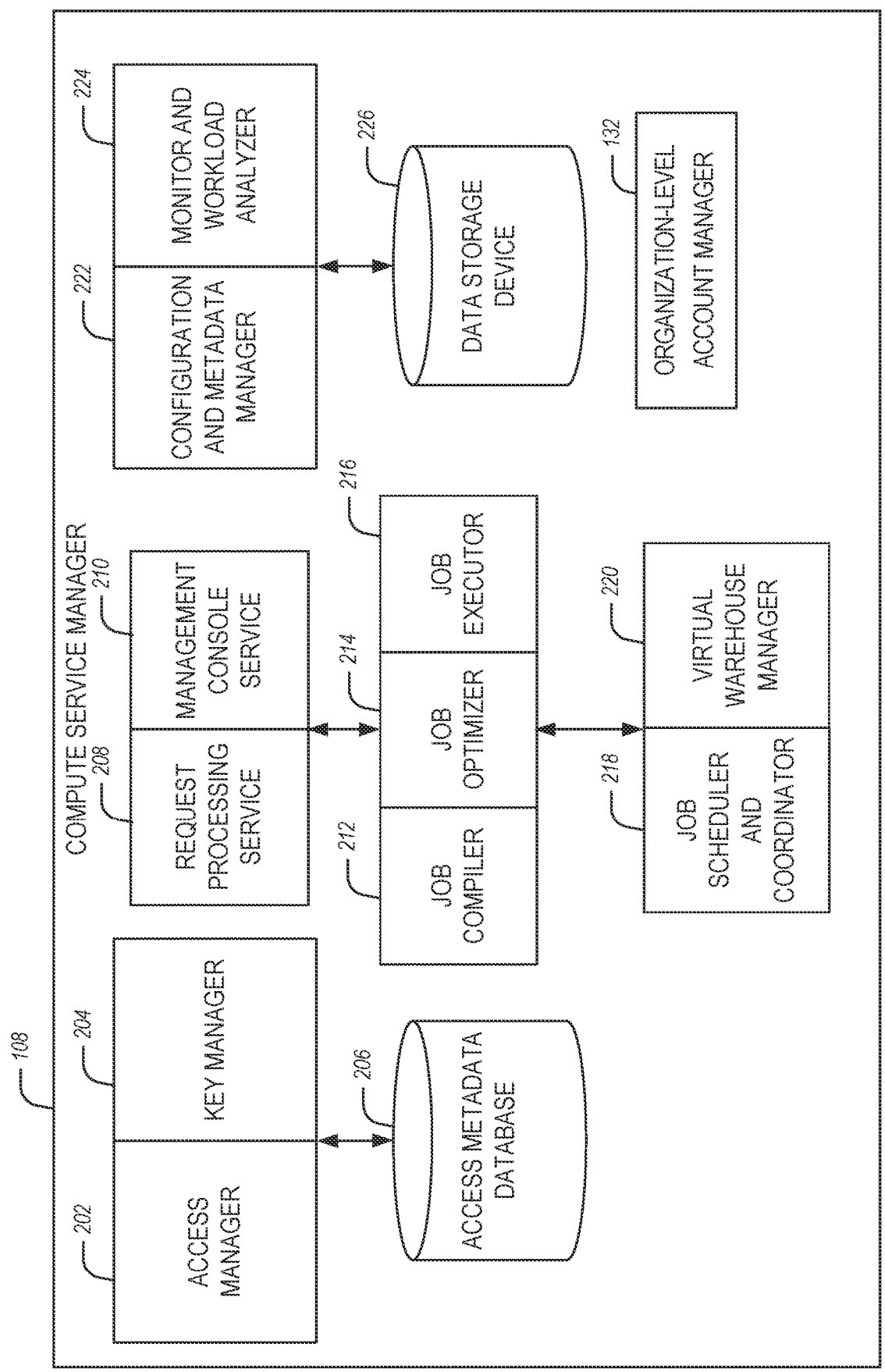
FIG. 2 is a block diagram illustrating the components of a compute service manager including an organization-level account manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to an access metadata database 206, which is an example of the one or more metadata databases 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs, such as user queries, that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in the execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1), and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the organization-level account manager 132 configured to perform the disclosed functionalities associated with one or more organization-level accounts, across deployments, in connection with one or more organizations.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with execution platform 110, virtual warehouses 1, ..., N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

Execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 (e.g., execution node 302-1) can be configured with the organization-level account manager 132, which can facilitate management (e.g., creation, modification, or deletion) of one or more organization-level accounts for one or more organizations on the network-based database system.

Figure 4:
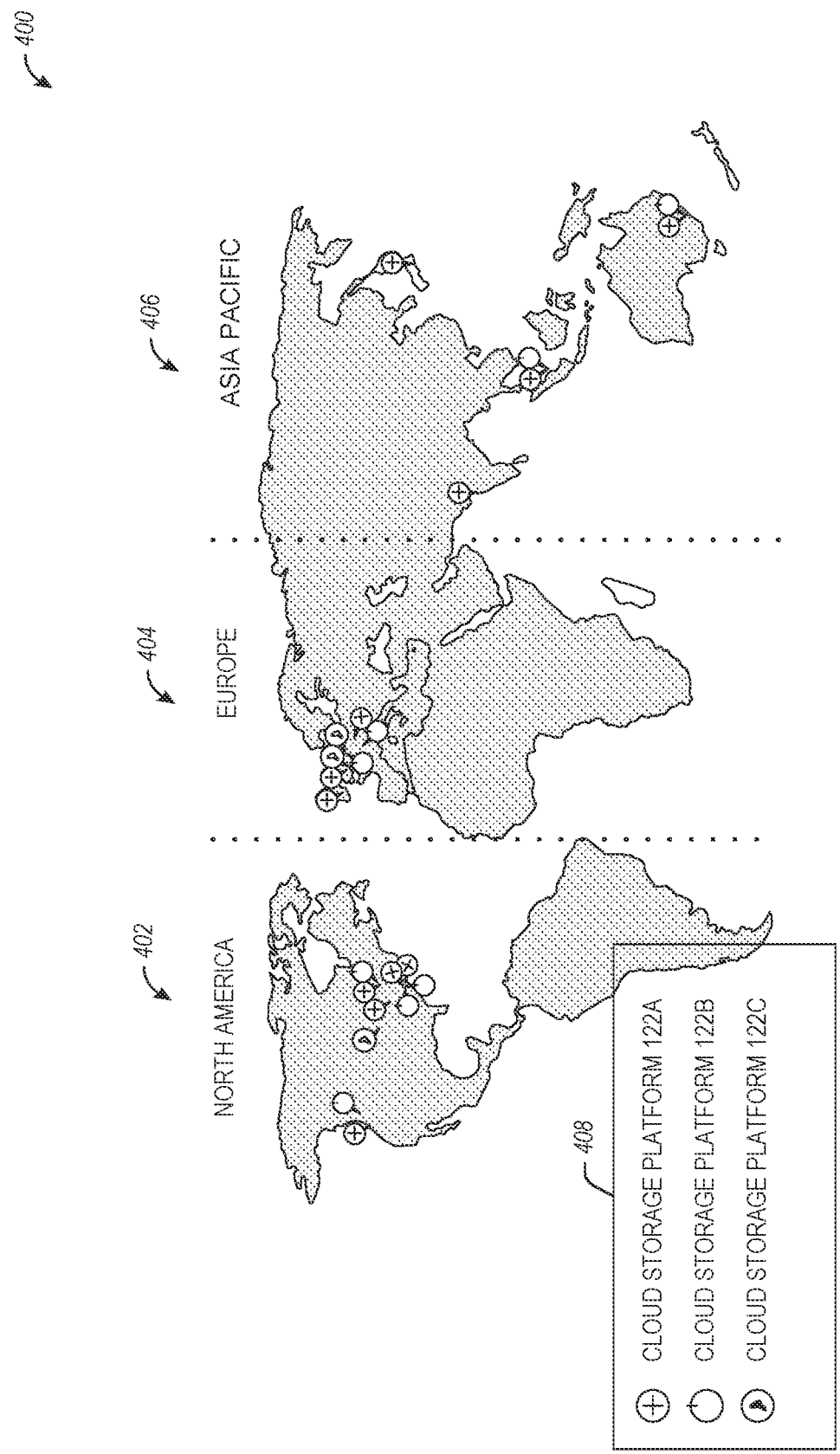
FIG. 4 illustrates an example regional-deployment map for the example database system of FIG. 1, in accordance with some embodiments of the present disclosure.

FIG. 4 illustrates an example regional-deployment map 400 for the example database system of FIG. 1, in accordance with some embodiments of the present disclosure. The regional-deployment map 400 is presented purely by way of example and not limitation, as different numbers and/or boundaries of regions could be demarcated in different implementations. As can be seen in FIG. 4, the regional-deployment map 400 includes three example geographic regions: North American region 402, European region 404, and Asia Pacific region 406. Moreover, various instances of deployments of the network-based database system 102 are depicted on the regional-deployment map 400. A legend 408 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as storage platforms 122, which are also illustrated in FIG. 1.

In some embodiments, one of the cloud-storage platforms 122A, 122B, and 122C includes (or hosts) one or more deployments that comprise one or more organization-level accounts for one or more organizations, and one or more of the cloud-storage platforms 122A, 122B, and 122C include (or host) one or more deployments that comprise one or more non-organization-level accounts for one or more organizations.

Figure 5:
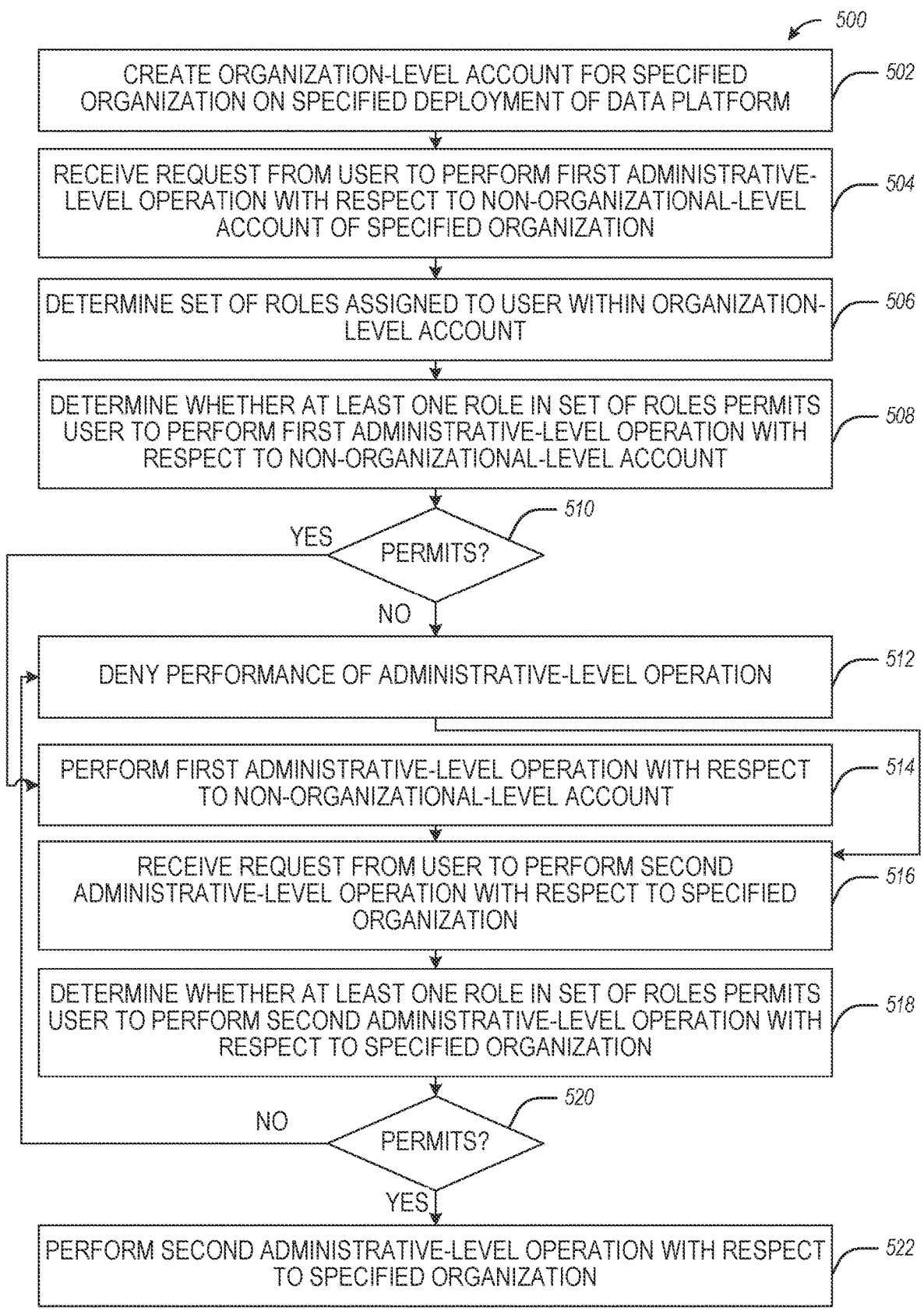
FIG. 5 is a flow diagram illustrating the operations of a database system in performing a method for organization-level accounts, in accordance with some embodiments of the present disclosure.

FIG. 5 is a flow diagram illustrating the operations of a database system in performing method 500 for organization-level accounts, in accordance with some embodiments of the present disclosure. Method 500 may be embodied in computer-readable instructions for execution by one or more hardware components (e.g., one or more processors) such that the operations of method 500 may be performed by components of the network-based database system 102, such as a network node (e.g., the organization-level account manager 132 executing on a network node of the compute service manager 108) or computing device (e.g., client device 114) which may be implemented as machine 600 of FIG. 6 and may be configured to perform the disclosed functions. Accordingly, method 500 is described below, by way of example with reference thereto. However, it shall be appreciated that method 500 may be deployed on various other hardware configurations and is not intended to be limited to deployment within the network-based database system 102.

At operation 502, an organization-level account is created for a specified organization on a specified deployment of a data platform, where the specified organization has a set of non-organization-level accounts, and the organization-level account comprises a set of users. For various embodiments, the set of users includes at least one user (e.g., admin user) associated with (e.g., granted or assigned an org-admin role). According to various embodiments, one or more users of the organization-level account can possess one or more administrative or management privileges with respect to the specified organization and across one or more other accounts (e.g., non-organization-level accounts) of the specified organization. Operation 502 can be performed, for example, in response to a request from a user associated with the specified organization (e.g., a user of a non-organization-level account of the specified organization), where the request is to perform a create organization-level account operation. For instance, the request can comprise the following DDL command, which causes the creation of the organization-level account and specifies creation of a user for the organization-level account having an org-admin role: CREATE ORGANIZATION ACCOUNT <account_name> ORGADMIN_NAME <name> . . . . For various embodiments, any account (e.g., secondary organization-level account, non-organization-level account, etc.) created for the specified organization can be managed from the organization-level account created by operation 502.

At operation 504, a request is received (e.g., at the specified deployment), from a user of the set of users of organization-level account, to perform an administrative-level operation with respect to at least one non-organization-level account (e.g., on the specified deployment or another deployment) in the set of non-organization-level accounts of the specified organization. In response to the request received at operation 504, at operation 506, a set of roles assigned to the user within the organization-level account is determined (e.g., by the specified deployment). Thereafter, at operation 508, it is determined (e.g., by the specified deployment) whether at least one role in the set of roles (determined at operation 506) permits the user to perform the administrative-level operation with respect to the at least one non-organization-level account. At decision point 510, in response to determining that at least one role in the set of roles permits the user to perform the administrative-level operation with respect to the at least one non-organization-level account, the method 500 proceeds to operation 514, otherwise the method 500 proceeds to operation 512, where performance of the administrative-level operation (with respect to the at least one non-organization-level account) is denied.

At operation 514, the administrative-level operation is performed with respect to the at least one non-organization-level account. For some embodiments, the administrative-level operation comprises managing a new user or an existing user with respect to the at least one non-organization-level account. For instance, the administrative-level operation can comprise a CRUD operation respect to an account of the at least one non-organization-level account, such as creating a new user to the at least one non-organization-level account, removing an existing user from the at least one non-organization-level account, or updating (e.g., changing) a privilege or a role of the existing user of the at least one non-organization-level account. For some embodiments, the administrative-level operation comprises managing a data object (e.g., user, roles, privileges, databases, schemas, tables, views,) of the at least one non-organization-level account. For instance, the administrative-level operation can comprise a CRUD operation with respect to a data object of the at least one non-organization-level account. For some embodiments, the administrative-level operation comprises monitoring metadata (e.g., organization view) of the at least one non-organization-level account. For some embodiments, the administrative-level operation comprises at least one of viewing or managing (e.g., performing a CRUD operation with respect to) an organization view of the at least one non-organization-level account. For some embodiments, the administrative-level operation comprises switching (e.g., logging) into a context of the at least one non-organization-level account. For some embodiments, the administrative-level operation comprises moving the at least one non-organization-level account from a first deployment of the data platform to a second deployment of the data platform.

Eventually (e.g., after operation 512 or operation 514), at operation 516, a request is received (e.g., at the specified deployment), from the user to perform a second administrative-level operation with respect to the specified organization. In response to the request received at operation 516, at operation 518, it is determined (e.g., by the specified deployment) whether at least one role in the set of roles (determined at operation 506) permits the user to perform the second administrative-level operation with respect to the specified organization. At decision point 520, in response to determining that at least one role in the set of roles permits the user to perform the second administrative-level operation with respect to the specified organization, the method 500 proceeds to operation 522, otherwise the method 500 proceeds to operation 512, where performance of the second administrative-level operation (with respect to the specified organization) is denied.

For some embodiments, the second administrative-level operation comprises merging the specified organization into a target organization. For instance, the merging of the specified organization into the target organization can result in generation of a merged organization, and the second administrative-level operation can cause the organization-level account of the specified organization to be retained for the merged organization. In another instance, the merging of the specified organization into the target organization can result in generation of a merged organization, and the second administrative-level operation can cause a second organization-level account of the target organization to be retained for the merged organization. In yet another instance, the merging of the specified organization into the target organization can result in generation of a merged organization, and the second administrative-level operation can cause a second (new) organization-level account to be generated for the merged organization. For some embodiments, the second administrative-level operation comprises moving (e.g., migrating) the organization-level account from the specified deployment to a target deployment of the data platform. For some embodiments, the second administrative-level operation comprises management of (e.g., performing a CRUD operation with respect to) an organization-level data object of the specified organization.

For various embodiments, the organization-level account is set as a primary organization-level account of the specified organization, and the second administrative-level operation comprises enabling failover for the primary organization-level account using one or more secondary organization-level accounts. The second administrative-level operation can cause each of the one or more secondary organization-level accounts to be generated on a different deployment on the data platform, where each different deployment is different from the specified deployment. The second administrative-level operation can cause data replication (e.g., of data objects of the primary organization-level account) from the primary organization-level account to at least one of the one or more secondary organization-level accounts to be established or set up. For some embodiments, any user of a secondary organization-level account is limited to requesting a set of read-only administrative-level operations. A user of the primary organization-level account can be associated with (e.g., granted or assigned to) a role that enables the user to access read and write-based administrative-level operations. For some embodiments, the data platform detects failure of the specified deployment (that hosts the primary organization-level account), and in response to detecting the failure, the data platform causes a secondary organization-level account of the one or more secondary organization-level accounts to be set (e.g., activated) as a new primary organization-level account of the specified organization.

Figure 6:
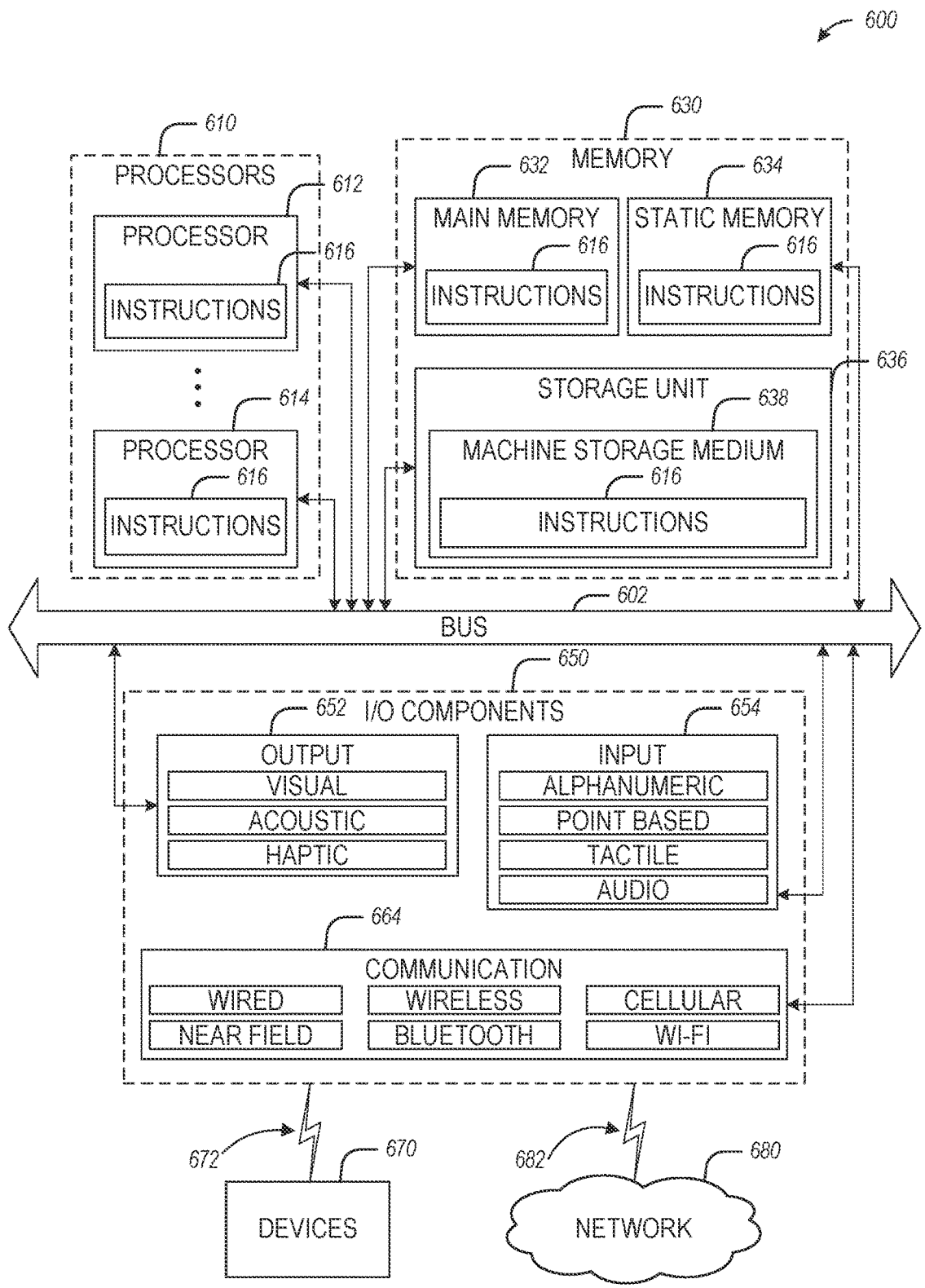
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of machine 600 in the example form of a computer system, within which instructions 616 (e.g., software, a program, an application, an applet, an app, or other executable code) for causing the machine 600 to perform any one or more of the methodologies discussed herein may be executed. For example, instructions 616 may cause machine 600 to execute any one or more operations of method 500. As another example, instructions 616 may cause machine 600 to implement one or more portions of the functionalities discussed herein. In this way, instructions 616 may transform a general, non-programmed machine into a particular machine 600 (e.g., the client device 114, the compute service manager 108, or a node in the execution platform 110) that is specially configured to carry out any one of the described and illustrated functions in the manner described herein. In yet another embodiment, instructions 616 may configure the client device 114, the compute service manager 108, and/or a node in the execution platform 110 to carry out any one of the described and illustrated functions in the manner described herein.

In alternative embodiments, the machine 600 operates as a standalone device or may be coupled (e.g., networked) to other machines. In a networked deployment, machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

Machine 600 includes processors 610, memory 630, and input/output (I/O) components 650 configured to communicate with each other such as via a bus 602. In some example embodiments, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within machine storage medium 638 of the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with network 680. In further examples, communication components 664 may include wired communication components, wireless communication components, cellular communication components, and other communication components to provide communication via other modalities. The device 670 may be another machine or any of a wide variety of peripheral devices (e.g., a peripheral device coupled via a universal serial bus (USB)). For example, as noted above, machine 600 may correspond to any one of the client device 114, the compute service manager 108, or the execution platform 110, and the devices 670 may include the client device 114 or any other computing device described herein as being in communication with the network-based database system 102 or the storage platform 104.

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 680 or a portion of network 680 may include a wireless or cellular network, and coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of several well-known transfer protocols (e.g., hypertext transfer protocol (HTTP)). Similarly, instructions 616 may be transmitted or received using a transmission medium via coupling 672 (e.g., a peer-to-peer coupling or another type of wired or wireless network coupling) to device 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: a set of hardware processors; and memory storing instructions that cause the set of hardware processors to perform operations comprising: creating an organization-level account for a specified organization on a specified deployment of a data platform, the specified organization having a set of non-organization-level accounts, the organization-level account comprising a set of users; receiving a request from a user of the set of users to perform an administrative-level operation with respect to at least one non-organization-level account in the set of non-organization-level accounts; and in response to the request: determining a set of roles assigned to the user within the organization-level account; determining whether at least one role in the set of roles permits the user to perform the administrative-level operation with respect to the at least one non-organization-level account; and in response to determining that at least one role in the set of roles permits the user to perform the administrative-level operation with respect to the at least one non-organization-level account, performing the administrative-level operation with respect to the at least one non-organization-level account.

In Example 2, the subject matter of Example 1 includes, wherein the administrative-level operation comprises managing a new user or an existing user with respect to the at least one non-organization-level account.

In Example 3, the subject matter of Examples 1-2 includes, wherein the administrative-level operation comprises managing a data object of the at least one non-organization-level account.

In Example 4, the subject matter of Examples 1-3 includes, wherein the administrative-level operation comprises monitoring metadata of the at least one non-organization-level account.

In Example 5, the subject matter of Examples 1-4 includes, wherein the administrative-level operation comprises at least one of viewing or managing an organization view of the at least one non-organization-level account.

In Example 6, the subject matter of Examples 1-5 includes, wherein the administrative-level operation comprises switching into a context of the at least one non-organization-level account.

In Example 7, the subject matter of Examples 1-6 includes, wherein the administrative-level operation comprises moving the at least one non-organization-level account from a first deployment of the data platform to a second deployment of the data platform.

In Example 8, the subject matter of Examples 1-7 includes, wherein the request is a first request, wherein the administrative-level operation is a first administrative-level operation, and where the operations comprise: receiving a second request from the user to perform a second administrative-level operation with respect to the specified organization; and in response to the second request: determining whether at least one role in the set of roles permits the user to perform the second administrative-level operation with respect to the specified organization; and in response to determining that at least one role in the set of roles permits the user to perform the second administrative-level operation with respect to the specified organization, performing the second administrative-level operation with respect to the specified organization.

In Example 9, the subject matter of Example 8 includes, wherein the second administrative-level operation comprises merging the specified organization into a target organization.

In Example 10, the subject matter of Example 9 includes, wherein the merging of the specified organization into the target organization results in generation of a merged organization, and wherein the second administrative-level operation causes the organization-level account of the specified organization to be retained for the merged organization.

In Example 11, the subject matter of Examples 9-10 includes, wherein the organization-level account is a first organization-level account of the specified organization, wherein the merging of the specified organization into the target organization results in generation of a merged organization, and wherein the second administrative-level operation causes a second organization-level account of the target organization to be retained for the merged organization.

In Example 12, the subject matter of Examples 9-11 includes, wherein the organization-level account is a first organization-level account of the specified organization, wherein the merging of the specified organization into the target organization results in generation of a merged organization, and wherein the second administrative-level operation causes a second organization-level account to be generated for the merged organization.

In Example 13, the subject matter of Examples 8-12 includes, wherein the second administrative-level operation comprises moving the organization-level account from the specified deployment to a target deployment of the data platform.

In Example 14, the subject matter of Examples 8-13 includes, wherein the organization-level account is a primary organization-level account of the specified organization, and wherein the second administrative-level operation comprises enabling failover for the primary organization-level account using one or more secondary organization-level accounts.

In Example 15, the subject matter of Example 14 includes, wherein the second administrative-level operation causes each of the one or more secondary organization-level accounts to be generated on a different deployment on the data platform, each different deployment being different from the specified deployment.

In Example 16, the subject matter of Examples 14-15 includes, wherein the second administrative-level operation causes data replication from the primary organization-level account to at least one of the one or more secondary organization-level accounts to be established.

In Example 17, the subject matter of Examples 14-16 includes, wherein the user is a first user of the primary organization-level account, and wherein any user of a secondary organization-level account is limited to requesting a set of read-only administrative-level operations.

In Example 18, the subject matter of Examples 14-17 includes, wherein the primary organization-level account is an existing primary organization-level account of the specified organization, and wherein the operations comprise: detecting failure of the specified deployment; and in response to detecting the failure, causing a secondary organization-level account of the one or more secondary organization-level accounts to be set as a new primary organization-level account of the specified organization.

In Example 19, the subject matter of Examples 8-18 includes, wherein the second administrative-level operation comprises management of an organization-level data object of the specified organization.

Example 20 is a method to implement of any of Examples 1-19.

Example 21 is a machine-storage medium comprising instructions that, when executed by one or more hardware processors of a machine, configure the machine to perform operations to implement of any of Examples 1-19.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   a set of hardware processors; and
   memory storing instructions that cause the set of hardware processors to perform operations comprising:
   creating an organization-level account for a specified organization on a specified deployment of a data platform, the specified organization having a set of non-organization-level accounts, the organization-level account comprising a set of users;
   receiving a request from a user of the set of users to perform an administrative-level operation with respect to at least one non-organization-level account in the set of non-organization-level accounts; and
   in response to the request:
   determining a set of roles assigned to the user within the organization-level account;
   determining whether at least one role in the set of roles permits the user to perform the administrative-level operation with respect to the at least one non-organization-level account; and
   in response to determining that at least one role in the set of roles permits the user to perform the administrative-level operation with respect to the at least one non-organization-level account, performing the administrative-level operation with respect to the at least one non-organization-level account.

2. The system of claim 1, wherein the administrative-level operation comprises managing a new user or an existing user with respect to the at least one non-organization-level account.

3. The system of claim 1, wherein the administrative-level operation comprises managing a data object of the at least one non-organization-level account.

4. The system of claim 1, wherein the administrative-level operation comprises monitoring metadata of the at least one non-organization-level account.

5. The system of claim 1, wherein the administrative-level operation comprises at least one of viewing or managing an organization view of the at least one non-organization-level account.

6. The system of claim 1, wherein the administrative-level operation comprises switching into a context of the at least one non-organization-level account.

7. The system of claim 1, wherein the administrative-level operation comprises moving the at least one non-organization-level account from a first deployment of the data platform to a second deployment of the data platform.

8. The system of claim 1, wherein the request is a first request, wherein the administrative-level operation is a first administrative-level operation, and where the operations comprise:
   receiving a second request from the user to perform a second administrative-level operation with respect to the specified organization; and
   in response to the second request:
   determining whether at least one role in the set of roles permits the user to perform the second administrative-level operation with respect to the specified organization; and
   in response to determining that at least one role in the set of roles permits the user to perform the second administrative-level operation with respect to the specified organization, performing the second administrative-level operation with respect to the specified organization.

9. The system of claim 8, wherein the second administrative-level operation comprises merging the specified organization into a target organization.

10. The system of claim 9, wherein a merged organization is generated by the merging of the specified organization into the target organization, and wherein the second administrative-level operation causes the organization-level account of the specified organization to be retained for the merged organization.

11. The system of claim 9, wherein the organization-level account is a first organization-level account of the specified organization, wherein a merged organization is generated by the merging of the specified organization into the target organization, and wherein the second administrative-level operation causes a second organization-level account of the target organization to be retained for the merged organization.

12. The system of claim 9, wherein the organization-level account is a first organization-level account of the specified organization, wherein a merged organization is generated by the merging of the specified organization into the target organization, and wherein the second administrative-level operation causes a second organization-level account to be generated for the merged organization.

13. The system of claim 8, wherein the second administrative-level operation comprises moving the organization-level account from the specified deployment to a target deployment of the data platform.

14. The system of claim 8, wherein the organization-level account is a primary organization-level account of the specified organization, and wherein the second administrative-level operation comprises enabling failover for the primary organization-level account using one or more secondary organization-level accounts.

15. The system of claim 14, wherein the second administrative-level operation causes each of the one or more secondary organization-level accounts to be generated on a different deployment on the data platform, each different deployment being different from the specified deployment.

16. The system of claim 14, wherein the second administrative-level operation causes data replication from the primary organization-level account to at least one of the one or more secondary organization-level accounts to be established.

17. The system of claim 14, wherein the user is a first user of the primary organization-level account, and wherein any user of a secondary organization-level account is limited to requesting a set of read-only administrative-level operations.

18. The system of claim 14, wherein the primary organization-level account is an existing primary organization-level account of the specified organization, and wherein the operations comprise:
  detecting failure of the specified deployment; and
  in response to detecting the failure, causing a secondary organization-level account of the one or more secondary organization-level accounts to be set as a new primary organization-level account of the specified organization.

19. The system of claim 8, wherein the second administrative-level operation comprises management of an organization-level data object of the specified organization.

20. A method comprising:
  creating, by at least one hardware processor, an organization-level account for a specified organization on a specified deployment of a data platform, the specified organization having a set of non-organization-level accounts, the organization-level account comprising a set of users;
  receiving, at the specified deployment, a request from a user of the set of users to perform an administrative-level operation with respect to at least one non-organization-level account in the set of non-organization-level accounts; and
  in response to the request:
  determining, by the specified deployment, a set of roles assigned to the user within the organization-level account;
  determining, by the specified deployment, whether at least one role in the set of roles permits the user to perform the administrative-level operation with respect to the at least one non-organization-level account; and
  in response to determining that at least one role in the set of roles permits the user to perform the administrative-level operation with respect to the at least one non-organization-level account, performing, by the specified deployment, the administrative-level operation with respect to the at least one non-organization-level account.

21. The method of claim 20, wherein the administrative-level operation comprises managing a new user or an existing user with respect to the at least one non-organization-level account.

22. The method of claim 20, wherein the administrative-level operation comprises managing a data object of the at least one non-organization-level account.

23. The method of claim 20, wherein the administrative-level operation comprises at least one of viewing or managing an organization view of the at least one non-organization-level account.

24. The method of claim 20, wherein the administrative-level operation comprises switching into a context of the at least one non-organization-level account.

25. The method of claim 20, wherein the administrative-level operation comprises moving the at least one non-organization-level account from a first deployment of the data platform to a second deployment of the data platform.

26. The method of claim 20, wherein the request is a first request, wherein the administrative-level operation is a first administrative-level operation, and where the method comprises:
  receiving, at the specified deployment, a second request from the user to perform a second administrative-level operation with respect to the specified organization; and
  in response to the second request:
  determining, by the specified deployment, whether at least one role in the set of roles permits the user to perform the second administrative-level operation with respect to the specified organization; and
  in response to determining that at least one role in the set of roles permits the user to perform the second administrative-level operation with respect to the specified organization, performing, by the specified deployment, the second administrative-level operation with respect to the specified organization.

27. The method of claim 26, wherein the second administrative-level operation comprises merging the specified organization into a target organization.

28. The method of claim 26, wherein the second administrative-level operation comprises moving the organization-level account from the specified deployment to a target deployment of the data platform.

29. The method of claim 26, wherein the organization-level account is a primary organization-level account of the specified organization, and wherein the second administrative-level operation comprises enabling failover for the primary organization-level account using one or more secondary organization-level accounts.

30. A machine-storage medium comprising instructions that, when executed by one or more hardware processors of a machine, configure the machine to perform operations comprising:
  creating an organization-level account for a specified organization on a specified deployment of a data platform, the specified organization having a set of non-organization-level accounts, the organization-level account comprising a set of users;
  receiving a request from a user of the set of users to perform an administrative-level operation with respect to at least one non-organization-level account in the set of non-organization-level accounts; and in response to the request:

determining a set of roles assigned to the user within the organization-level account;

determining whether at least one role in the set of roles permits the user to perform the administrative-level operation with respect to the at least one non-organization-level account; and in response to determining that at least one role in the set of roles permits the user to perform the administrative-level operation with respect to the at least one non-organization-level account, performing the administrative-level operation with respect to the at least one non-organization-level account.

* * * * *